(12) United States Patent
Yokomakura et al.

(10) Patent No.: US 8,488,664 B2
(45) Date of Patent: Jul. 16, 2013

(54) RADIO COMMUNICATION SYSTEM, RECEPTION DEVICE, AND RECEPTION METHOD

(75) Inventors: Kazunari Yokomakura, Osaka (JP); Yasuhiro Hamaguchi, Osaka (JP); Hideo Namba, Osaka (JP); Shimpei To, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

(21) Appl. No.: 12/809,553

(22) PCT Filed: Dec. 17, 2008

(86) PCT No.: PCT/JP2008/073004
§ 371 (c)(1),
(2), (4) Date: Jun. 18, 2010

(87) PCT Pub. No.: WO2009/081820
PCT Pub. Date: Jul. 2, 2009

(65) Prior Publication Data
US 2010/0260251 A1    Oct. 14, 2010

(30) Foreign Application Priority Data

Dec. 20, 2007  (JP) ............................... P2007-329008

(51) Int. Cl.
*H03H 7/30*    (2006.01)
(52) U.S. Cl.
USPC ........................... 375/232; 370/252; 375/260
(58) Field of Classification Search
USPC .................. 370/235, 252, 343, 431; 375/232, 375/261, 341
See application file for complete search history.

(56) References Cited

U.S. PATENT DOCUMENTS

| 7,184,713 | B2 | 2/2007 | Kadous et al. | |
|---|---|---|---|---|
| 2003/0086371 | A1 | 5/2003 | Walton et al. | |
| 2003/0087673 | A1 | 5/2003 | Walton et al. | |
| 2003/0095506 | A1 | 5/2003 | Jalali et al. | |
| 2003/0095508 | A1 | 5/2003 | Kadous et al. | |
| 2004/0081191 | A1* | 4/2004 | Kwon et al. | 370/431 |
| 2005/0286624 | A1* | 12/2005 | Park | 375/232 |

(Continued)

FOREIGN PATENT DOCUMENTS

| CN | 1615624 A | 5/2005 |
|---|---|---|
| EP | 1 775 901 A1 | 4/2007 |

(Continued)

OTHER PUBLICATIONS

Falconer et al., "Frequency Domain Equalization for Single-Carrier Broadband Wireless Systems", IEEE Communications Magazine, vol. 40, pp. 58-66, Apr. 2002.

*Primary Examiner* — Leon-Viet Nguyen
(74) *Attorney, Agent, or Firm* — Birch, Stewart, Kolasch & Birch, LLP (57) ABSTRACT

A reception device which receives a signal transmitted by a transmission device that changes at least one of a modulation scheme and a coding rate based on information reported from the reception device, the reception device includes an equalization unit which equalizes a received signal in a frequency domain, a signal-noise ratio measuring unit which measures a signal-noise ratio from the received signal after equalization, and a notification signal generation unit which sets at least one of a modulation scheme and a coding rate from the quality of reception and generates a signal to be reported to the transmission device.

14 Claims, 3 Drawing Sheets

U.S. PATENT DOCUMENTS

| | | |
|---|---|---|
| 2006/0072679 A1* | 4/2006 | Chen et al. .................... 375/261 |
| 2008/0013638 A1* | 1/2008 | Walton et al. ................. 375/260 |
| 2008/0188184 A1 | 8/2008 | Nogami et al. |
| 2009/0323666 A1* | 12/2009 | Malladi et al. ................ 370/345 |

FOREIGN PATENT DOCUMENTS

| | | |
|---|---|---|
| JP | 2004-535106 A | 11/2004 |
| JP | 2005-510904 A | 4/2005 |
| JP | 2005-535167 A | 11/2005 |
| JP | 2006-501695 A | 1/2006 |
| JP | 2008-118567 A | 5/2008 |
| WO | WO 03/041330 A2 | 5/2003 |
| WO | WO 03/047198 A2 | 6/2003 |
| WO | WO 2006/011524 A1 | 2/2006 |
| WO | WO 2006/098105 A1 | 9/2006 |
| WO | WO 2007/029406 A1 | 3/2007 |

* cited by examiner

RADIO COMMUNICATION SYSTEM, RECEPTION DEVICE, AND RECEPTION METHOD

TECHNICAL FIELD

The present invention relates to a radio communication system, a reception device, and a reception method.

Priority is claimed on Japanese Patent Application No. 2007-329008, filed on Dec. 20, 2007, the contents of which are incorporated herein by reference.

BACKGROUND ART

In recent years, research on next-generation mobile communication systems has been actively conducted. In such research on next-generation mobile communication systems, a cellular system which repeatedly uses one frequency has been proposed as a system for increasing the frequency use efficiency of the system. In this cellular system, each cell uses the same frequency band, thereby enabling each cell to use all bands allocated to the system.

As a communication scheme to be used by downlink, an OFDMA (Orthogonal Frequency Division Multiple Access) scheme is the most prominent candidate. The downlink refers to communication from a base station device to a mobile station. The OFDMA scheme is a system which performs communication by flexibly allocating radio resources to a plurality of mobile terminal devices using an OFDM signal to be communicated with a different modulation scheme for information data in response to a reception situation. Modulation schemes are 64QAM (64-ary Quadrature Amplitude Modulation), BPSK (Binary Phase Shift Keying), and the like. The radio resources are constituted by a time axis and a frequency axis.

In general, even when frequency selectivity fading occurs in the entire transmission band for an OFDM signal, a delay wave of a propagation channel may be treated as flat fading in view of a sub-carrier unit. This is because each sub-carrier is a narrow band.

Since control may be independently performed in the sub-carrier unit, inter-code interference caused by the delay wave does not exist and equalization is not necessary. Thus, the mobile station may detect a received signal of each sub-carrier in a reception situation as it is. Accordingly, the mobile station may appropriately control the quality of transmission when an adaptive modulation scheme is used to allocate an appropriate modulation scheme in response to the reception situation.

In this case, a PAPR (Peak to Average Power Ratio) may be greatly raised to use an OFDM signal. The occurrence of high peak power is not a large problem in downlink communication which has a relative margin for amplifying transmission power. However, the occurrence of high peak power is a fatal problem in uplink for which no margin exists for amplifying transmission power. The uplink refers to communication from the mobile station to the base station device.

Thus, in the uplink, it is desirable to use a communication scheme based on a single carrier scheme having a low PAPR.

However, when the communication scheme based on the single carrier scheme is used, a sub-carrier may not be independently processed as in the OFDM scheme. Thus, since inter-code interference caused by a delay wave may not be suppressed, an adaptive equalization technique is necessary to suppress inter-code interference of a reception signal.

As an adaptive equalization technique, there has been proposed a frequency domain equalization technique (FDE: Frequency Domain Equalization) in which equalization is possible by one product operation in a frequency domain by adding a CP (Cyclic Prefix) for the purpose of maintaining periodicity for a time signal into which a plurality of transmission signals has been blocked even under a multipath fading environment and removing the CP by a reception side (Non-Patent Document 1). Since an FFT unit becomes a block, the blocked transmission signals are referred to as an FFT block.

In the frequency domain equalization technique (FDE), a type of ZF (Zero Forcing) is known which restores a signal component by multiplying an inverse characteristic of a frequency response of a propagation channel based on the fact that the convolution of an impulse response on the time axis is a multiplication of the frequency domain. However, since thermal noise is reliably added to a received signal inside the mobile station when the equalization is performed by a reception side, the inverse characteristic of the propagation channel is multiplied even in terms of noise when the inverse characteristic of the propagation channel is multiplied. As a result, there is a problem in that a transmission characteristic thereof is worse than an actual transmission characteristic since the noise is colored and emphasized.

For the purpose of suppressing noise emphasis, MMSE-FDE based on the MMSE (Minimum Mean Square Error) criterion has been proposed to minimize the square of an error between a signal after equalization and a transmission signal. A tap matrix of MMSE-FDE is expressed by Equation (1).

$$W^H = (\Xi\Xi^H + \sigma^2 I)^{-1} \Xi \qquad (1)$$

In Equation (1), W is a tap matrix expressed by a complex square matrix of an FFT block size using a tap coefficient as an element. $\Xi$ is a complex diagonal matrix in which a frequency response of a propagation channel is arranged in a diagonal component. I is a unit matrix in which only the diagonal matrix is 1 and the remaining elements are 0. $\sigma^2$ is a real number indicating a variance of thermal noise. In general, the tap matrix is expressed by the following equation when a $k^{th}$ transmitted signal within the FFT block is estimated by equalization.

$$s_{est}(k) = F^H w^H(k) R$$

In this regard, F is a K×K complex square matrix to apply a DFT process. K is a block size of the FFT block. w(k) is a K×1 complex column vector for detecting the $k^{th}$ transmitted signal within the FFT block. R denotes a K×1 complex received signal vector of a frequency axis.

The tap matrix of Equation (1) is extended to simultaneously detect all symbols within the block and is extended as in the following equation.

$$W = [w(1) \; w(2) \ldots w(K)]$$

On the other hand, adaptive modulation and coding schemes are attracting attention as a technique of improving the efficiency of transmission. The adaptive modulation and coding schemes are a technique of selecting a modulation scheme which maximizes a transmission rate in a state in which the required quality is satisfied or selecting a coding rate in communication channel coding so as to maintain the equality of transmission for a temporal change of characteristics of a propagation channel.

In general, the adaptive modulation and coding schemes measure the quality of reception including distortion of the propagation channel for each transmission opportunity based on error-rate characteristics measured under an AWGN (Additive White Gaussian Noise) environment without distortion by the propagation channel. A modulation scheme or coding rate capable of accomplishing a maximum transmission rate while satisfying the required quality is determined.

For example, as combinations of available modulation schemes and coding rates, received SNRs necessary at a bit error rate $10^{-5}$ in BPSK of a coding rate ½, BPSK of a coding rate ⅔, QPSK of a coding rate ½, QPSK of a coding rate ¾, and QPSK of a coding rate ⅚ under an AWGN environment are set to 1 dB, 2 dB, 3 dB, 6 dB, and 8 dB, respectively. It is assumed that a received SNR measured in a certain transmission opportunity is 7.5 dB. In this case, the selected modulation scheme and coding rate satisfy the required quality at 7.5 dB or less, and QPSK of a coding rate ¾ in which a highest transmission rate may be achieved is set as the modulation scheme and the coding rate.

Here, in the case where the adaptive modulation and coding schemes are adopted in a single carrier scheme even though an equalization scheme called MMSE-FDE is used, a modulation scheme is generally adopted based on an SNR (Signal to Noise power Ratio) before equalization.

Non-Patent Document 1: D. Falconer, S. L. Ariyavisitakul, A. Benyamin-Seeyar, and B. Eidson, "Frequency Domain Equalization for Single-Carrier Broadband Wireless Systems," IEEE Communications Magazine, vol. 40, pp. 58 to 66, April 2002.

DISCLOSURE OF INVENTION

Problem to be Solved by the Invention

However, in terms of the tap matrix of Equation (1), the tap coefficient in a $k^{th}$ discrete frequency is given as in Equation (2), and the magnitude of a tap at each frequency is set in response to the quality of reception of each frequency.

$$w^*(k) = \frac{\Xi(k)}{\Xi(k)\Xi^*(k) + \sigma^2} \quad (2)$$

In Equation (2), w(k) is a tap coefficient multiplied by the $k^{th}$ discrete frequency within the block. $\Xi(k)$ is a complex gain of the propagation channel in the $k^{th}$ discrete frequency. $\sigma^2$ denotes a variance of noise observed.

This means that an MMSE type FDE does not multiply an inverse characteristic of the propagation channel and a correction term corresponding to the quality of reception is set as $\sigma^2$ so that the balance of the effect of inter-code interference and noise emphasis becomes optimal from the purpose of suppressing the noise emphasis which is problematic by multiplying the inverse characteristic.

Also, this means that not only a change in the frequency axis of the tap coefficient caused by a delay variance of the propagation channel becomes severe even though the average received SNR is identical because of dependence upon a propagation channel characteristic and a noise variance, but also the effect of inter-code interference or noise emphasis which is not cut off is different.

This means that an inter-code interference quantity or a noise emphasis quantity incapable of being removed is different in the case where the delay variance of the propagation channel is different even though the average received SNR before equalization is identical.

Since the adaptive modulation and coding schemes were originally introduced for the purpose of maintaining the quality of reception, there is a problem in that the effect of inter-code interference or noise emphasis which is not cut off after equalization is excluded when setting is made in response to a received SNR before equalization, and an operation is not appropriately performed. For example, when a received SNR after equalization reaches an SNR effectively corresponding to 5 dB due to the effect of inter-code interference or noise emphasis, regardless of the fact that a received SNR measured before equalization is 6 dB, there is a problem in that the required quality is not satisfied in the case where the modulation scheme and the coding rate in which the required quality is set by 6 dB are adopted.

Since it is necessary to separately calculate an inter-code interference quantity by returning a propagation channel characteristic multiplied by a tap coefficient to a time domain so as to perform the adaptive modulation and coding schemes by the reception quality after equalization, there is a problem in that the calculation becomes complex. At this time, the received SNR of a $k^{th}$ signal within the block is expressed by Equation (3).

$$SNR = \frac{|h_{eq}(1)s(k)|^2}{\left|\sum_{l=2}^{K}\sum_{l'=1}^{K}h_{eq}(l)s(k-(l-1)-l')+n(k)\right|^2} \quad (3)$$

In Equation (3), K is the number of signals to be included within the block. $h_{eq}(l)$ is an $l^{th}$ propagation channel gain of an impulse response of an equivalent propagation channel by frequency-time converting the frequency response of the propagation channel multiplied by the tap coefficient by IFFT. s(k) is a $k^{th}$ time signal within the block. n(k) is a noise component obtained by converting noise of a frequency multiplied by a tap coefficient in the $k^{th}$ time signal within the block into a time signal by IFFT. Since not only IFFT is used to estimate $h_{eq}(l)$ or n(k), but it is also necessary to further use Equation (3) even though these are calculated, a large amount of calculation is necessary to calculate the received SNR.

The present invention has been made in view of the above-described circumstances, and an object of the invention is to provide a radio communication system, a reception device, and a reception method which are capable of improving an error rate or throughput when transmission and reception devices perform communication.

Means for Solving the Problem (1) The present invention has been made to solve the above-described problems. According to an aspect of the present invention, there is provided a radio communication system including: a transmission device which transmits data by changing at least one of a modulation scheme and a coding rate; and a reception device which equalizes distortion by a radio propagation channel from a received signal by frequency domain equalization, wherein the reception device sets at least one of the modulation scheme and the coding rate based on a signal-noise ratio after the frequency domain equalization.

(2) According to the aspect of the present invention, the reception device of the radio communication system may perform the frequency domain equalization based on a minimum mean square error.

(3) According to the aspect of the present invention, the reception device of the radio communication system may perform the frequency domain equalization based on zero forcing.

(4) According to the aspect of the present invention, the reception device of the radio communication system may calculate the signal-noise ratio based on at least one of an equivalent amplitude gain and a variance of equivalent noise calculated by the frequency domain equalization.

(5) According to the aspect of the present invention, the reception device of the radio communication system may calculate the equivalent amplitude gain by averaging the product of the tap coefficient of each frequency and the frequency response of a propagation channel in the frequency domain when the frequency domain equalization is performed based on a minimum mean square error.

(6) According to the aspect of the present invention, the reception device of the radio communication system may calculate the variance of equivalent noise by adding 1 to an absolute value of the tap coefficient of each frequency and averaging an addition result in a frequency domain when the frequency domain equalization is performed based on zero forcing.

(7) According to the aspect of the present invention, the reception device of the radio communication system may measure the signal-noise ratio based on a pilot signal for measuring a frequency response of a propagation channel.

(8) According to another aspect of the present invention, there is provided a reception device which receives a signal transmitted by a transmission device that changes at least one of a modulation scheme and a coding rate in response to the quality of reception, the reception device including: an equalization unit which equalizes a received signal in a frequency domain; a signal-noise ratio measuring unit which measures a signal-noise ratio from the received signal after equalization; and a notification signal generation unit which sets at least one of a modulation scheme and a coding rate from the signal-noise ratio and generates a signal to be reported to the transmission device.

In the present invention, it is possible to improve an error rate or throughput by measuring the signal-noise ratio based on the received signal after equalization, not before equalization and setting an appropriate modulation scheme or coding rate based on the measured signal-noise ratio.

(9) According to the other aspect of the present invention, the equalization unit of the reception device may equalize the received signal based on a minimum mean square error.

(10) According to the other aspect of the present invention, the equalization unit of the reception device may equalize the received signal based on zero forcing.

(11) According to the other aspect of the present invention, the equalization unit of the reception device may output at least one of an equivalent amplitude gain and a variance of equivalent noise.

(12) According to the other aspect of the present invention, the signal-noise ratio measuring unit of the reception device may calculate a signal-noise ratio after equalization from an equivalent amplitude gain when the equalization is performed based on a minimum mean square error.

(13) According to the other aspect of the present invention, the signal-noise ratio measuring unit of the reception device may calculate a signal-noise ratio after equalization from an equivalent amplitude gain when the equalization is performed based on zero forcing.

(14) According to a further aspect of the present invention, there is provided a reception device which receives a transmitted signal from a transmission device in which a pilot signal for propagation channel estimation and a transmission data signal in which at least one of a modulation scheme and a coding rate has been changed in response to the quality of reception are multiplexed, the reception device including: an equalization unit which equalizes a received signal in a frequency domain; a signal-noise ratio measuring unit which measures a signal-noise ratio from the received signal after equalization; and a notification signal generation unit which sets at least one of a modulation scheme and a coding rate from the signal-noise ratio and generates a signal to be reported to the transmission device.

(15) According to a further aspect of the present invention, the signal-noise ratio measuring unit of the reception device may calculate the signal-noise ratio based on a signal obtained by equalizing a received pilot signal.

(16) According to a still further aspect of the present invention, there is provided a reception method using a reception device which receives a signal transmitted by a transmission device that changes at least one of a modulation scheme and a coding rate in response to the quality of reception, the reception method including: an equalization process of equalizing a received signal in a frequency domain; a signal-noise ratio measuring process of measuring a signal-noise ratio from the received signal after equalization; and a notification signal generation process of setting at least one of a modulation scheme and a coding rate from the signal-noise ratio and generating a signal to be reported to the transmission device.

(17) According to a still further aspect of the present invention, there is provided a reception method using a reception device which receives a transmitted signal from a transmission device in which a pilot signal for propagation channel estimation and a transmission data signal in which at least one of a modulation scheme and a coding rate has been changed in response to the quality of reception are multiplexed, the reception method including: an equalization process of equalizing a received pilot signal in the frequency domain; a signal-noise ratio measuring process of measuring a signal-noise ratio from the received signal after equalization; and a notification signal generation process of setting at least one of a modulation scheme and a coding rate from the signal-noise ratio and generating a signal to be reported to the transmission device.

Effect of the Invention

According to the radio communication system, the reception device, and the reception method of the present invention, it is possible to improve an error rate or throughput when transmission and reception devices perform communication.

| Reference Symbols | |
|---|---|
| 1: | ENCODING UNIT |
| 2: | DETECTION UNIT |
| 3: | CODING RATE CONTROL UNIT |
| 4: | PUNCTURING UNIT |
| 5: | MODULATION SCHEME CONTROL UNIT |
| 6: | MODULATION UNIT |
| 7: | PILOT GENERATION UNIT |
| 8: | PILOT MULTIPLEXING UNIT |
| 9: | CP ADDITION UNIT |

-continued

| Reference Symbols | |
|---|---|
| 10: | RADIO UNIT |
| 11: | TRANSMISSION ANTENNA |
| 12: | RECEPTION ANTENNA |
| 13: | RADIO UNIT |
| 14: | CP REMOVAL UNIT |
| 15: | PILOT SEPARATION UNIT |
| 16: | PROPAGATION CHANNEL CHARACTERISTIC ESTIMATION UNIT |
| 17: | VARIANCE ESTIMATION UNIT |
| 18: | FFT UNIT |
| 19: | EQUALIZATION UNIT |
| 20: | IFFT UNIT |
| 21: | DEMODULATION UNIT |
| 22: | DECODING UNIT |
| 24: | POST-EQUALIZATION SNR ESTIMATION UNIT |
| 25: | MODULATION/CODING RATE INFORMATION GENERATION UNIT |
| 100a: | TRANSMISSION DEVICE |
| 101: | RECEPTION ANTENNA |
| 102: | RADIO UNIT |
| 103: | CP REMOVAL UNIT |
| 104: | PILOT COPY UNIT |
| 105: | PROPAGATION CHANNEL CHARACTERISTIC ESTIMATION UNIT |
| 106: | VARIANCE ESTIMATION UNIT |
| 107: | FFT UNIT |
| 108: | EQUALIZATION UNIT |
| 109: | IFFT UNIT |
| 110: | PILOT SEPARATION UNIT |
| 111: | DEMODULATION UNIT |
| 112: | DECODING UNIT |
| 113: | POST-EQUALIZATION SNR ESTIMATION UNIT |
| 114: | MODULATION/CODING RATE INFORMATION GENERATION UNIT |
| 200a, 200b: | RECEPTION DEVICE |

BEST MODE FOR CARRYING OUT THE INVENTION

Hereinafter, embodiments of the present invention will be described with reference to the drawings.

In the following embodiments, the case where a single carrier transmission scheme is used and MMSE criterion type FDE is used as a reception equalization scheme will be described. In a scheme capable of using MMSE criterion type frequency domain equalization, a scheme of frequency-converting an original time waveform, allocating it to an arbitrary frequency, and regenerating a time waveform from a frequency signal after allocation such as a DFT-S-OFDM (Discrete Fourier Transform Spread OFDM) scheme or an SC-ASA (Single Carrier with Adaptive Spectrum Allocation) may be used. A scheme in which a time signal is spread into a plurality of frequency signals such as MC-CDM (Multi-Carrier Code Division Multiplexing) may be used.

[First Embodiment]

Figure 1:
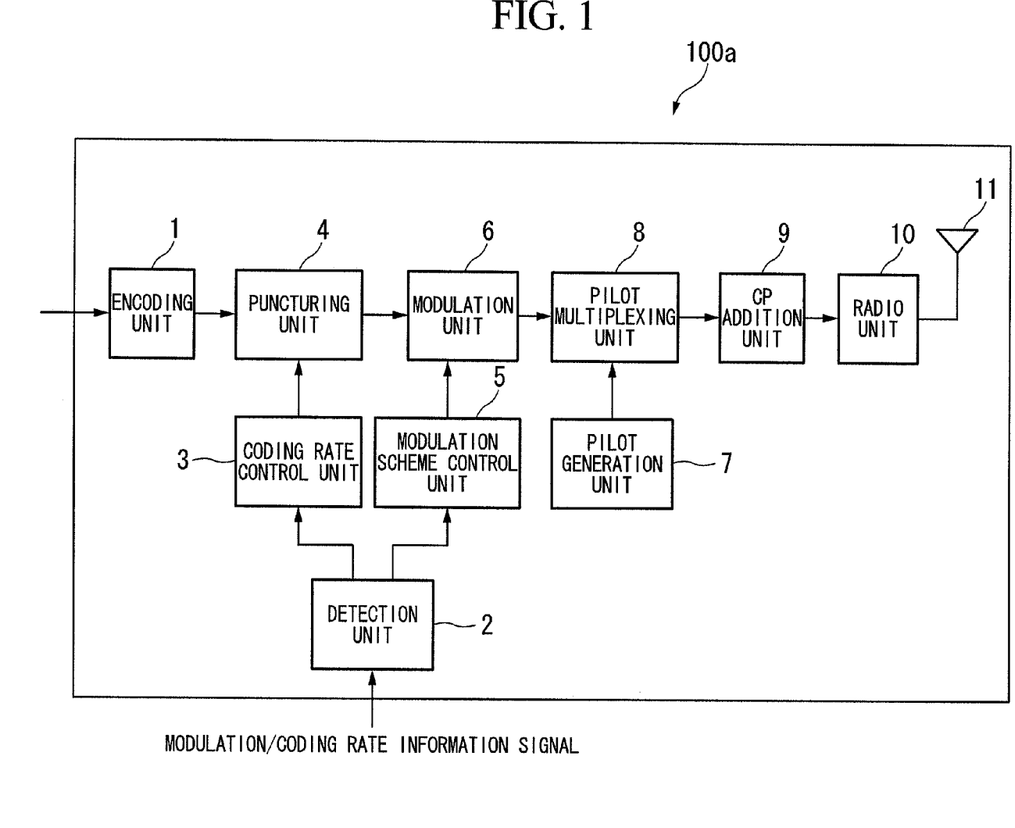
FIG. 1 is a schematic block diagram showing the configuration of a transmission device 100a according to a first embodiment of the present invention.

FIG. 1 is a schematic block diagram showing the configuration of a transmission device 100a according to a first embodiment of the present invention. A mobile station device includes a transmission device and a reception device for communicating with a base station device. The transmission device provided in the mobile station device corresponds to the transmission device 100a of FIG. 1. The transmission device 100a of FIG. 1 is applicable to other equipment.

The transmission device 100a has an encoding unit 1, a detection unit 2, a coding rate control unit 3, a puncturing unit 4, a modulation scheme control unit 5, a modulation unit 6, a pilot generation unit 7, a pilot multiplexing unit 8, a CP addition unit 9, a radio unit 10, and a transmission antenna 11.

A transmission bit is error-correction-coded by the encoding unit 1, and is input to the puncturing unit 4. On the other hand, a coding rate and a modulation scheme are detected by the detection unit 2 from modulation/coding rate information (MCS: Modulation and Coding Schemes) reported from the reception device. The coding rate information detected by the detection unit 2 is input to the coding rate control unit 3. The modulation scheme information detected by the detection unit 2 is input to the modulation scheme control unit 5.

The puncturing unit 4 executes a puncturing process for code bits input from the encoding unit 1. The puncturing process is a process of puncturing code bits so that a set coding rate is provided.

At this time, the coding rate control unit 3 controls the code bits to be punctured in response to a puncturing pattern from the set coding rate information. The puncturing pattern is a pattern prepared in advance to puncture bits. Thereby, the puncturing unit 4 generates code bits of an appropriate coding rate.

Next, the code bits obtained by the puncturing are input to the modulation unit 6, and are modulated in a set modulation scheme. At this time, the modulation scheme control unit 5 controls the set modulation scheme to be provided.

At this time, simultaneously, the pilot generation unit 7 generates a pilot signal for estimating a frequency response of a propagation channel, and the pilot multiplexing unit 8 multiplexes the pilot signal with a modulated signal obtained by the modulation unit 6. A cyclic prefix (CP) is added to a multiplexed transmission signal by the CP addition unit 9. The transmission signal is up-converted into a radio frequency band by the radio unit 10 and is transmitted from the transmission antenna 11 to the reception device.

Figure 2:
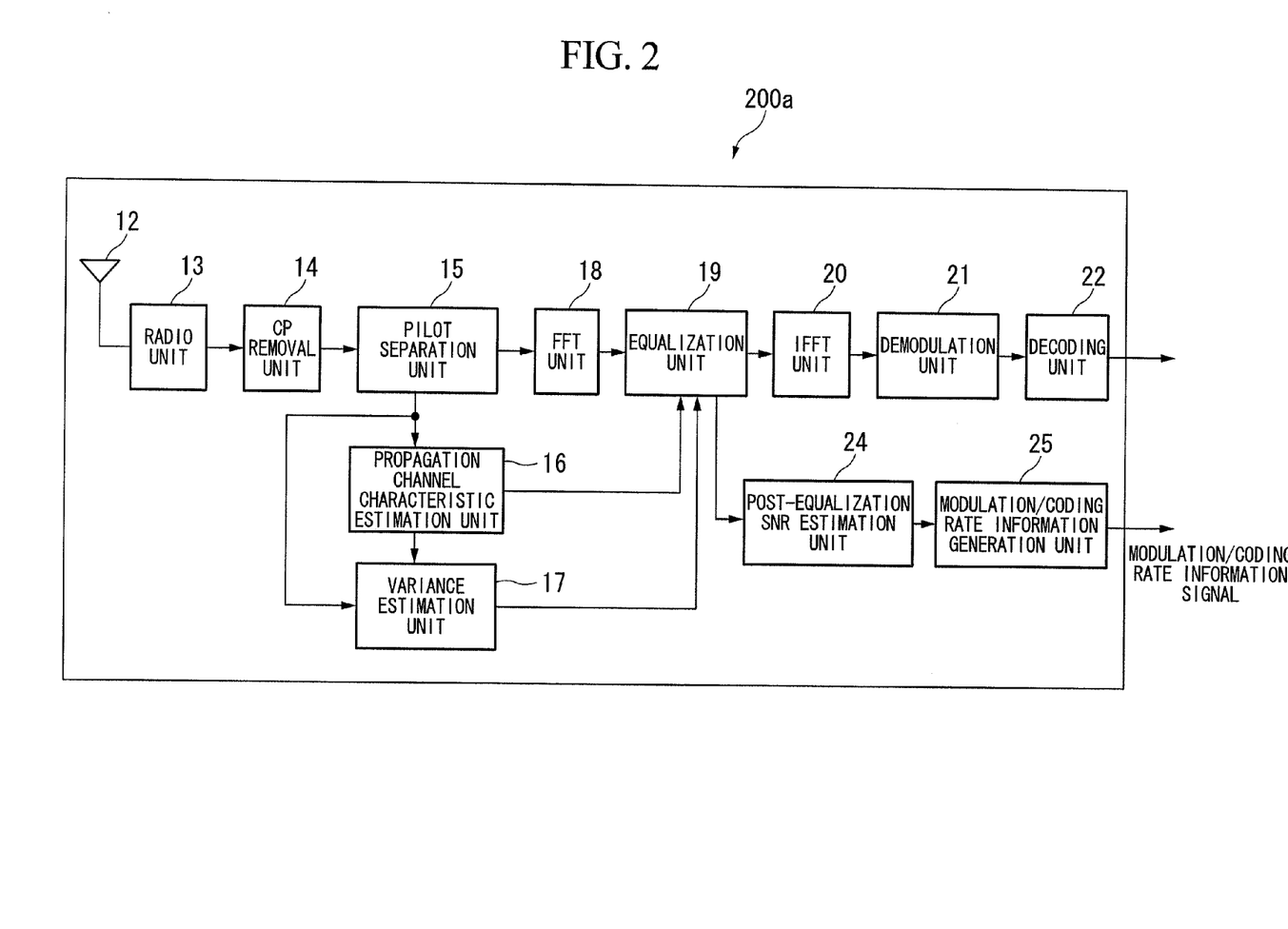
FIG. 2 is a schematic block diagram showing the configuration of a reception device 200a according to the first embodiment of the present invention.

FIG. 2 is a schematic block diagram showing the configuration of a reception device 200a according to the first embodiment of the present invention. A base station device has a transmission device and a reception device for communicating with the mobile station device. The reception device provided in the base station device corresponds to the reception device 200a of FIG. 2. The reception device 200a of FIG. 2 is applicable to other equipment.

The reception device 200a has a reception antenna 12, a radio unit 13, a CP removal unit 14, a pilot separation unit 15, a propagation channel characteristic estimation unit 16, a variance estimation unit 17, an FFT unit 18, an equalization unit 19, an IFFT unit 20, a demodulation unit 21, a decoding unit 22, a post-equalization SNR estimation unit 24 (also referred to as a signal-noise ratio measuring unit), and a modulation/coding rate information generation unit 25 (also referred to as a notification signal generation unit).

A received signal is received by the reception antenna 12 and then is down-converted from the radio frequency into a baseband signal by the radio unit 13. A cyclic prefix (CP) is removed by the CP removal unit 14 from the obtained received signal. A received pilot signal and a received modulated signal are separated by the pilot separation unit 15. A frequency characteristic of a propagation channel and the variance of noise of each frequency of the separated received pilot signal are estimated by the propagation channel characteristic estimation unit 16 and the variance estimation unit 17. For use in equalization, the separated received pilot signal is input to the equalization unit 19.

Here, the variance estimation unit 17 estimates a variance of the received pilot signal from the propagation channel characteristic estimated by the propagation channel characteristic estimation unit 16 and the received signal. At this time, the variance $\sigma^2$ is estimated as in the following Equation (4).

$$\sigma^2 = \frac{1}{K}\sum_{k=1}^{K}|y(k)-\Xi(k)c(k)|^2 \quad (4)$$

In Equation (4), K is the number of signals within a block. y(k) is a complex received pilot signal of a $k^{th}$ frequency. $\Xi(k)$ is a complex gain of the propagation channel in the $k^{th}$ frequency estimated by the propagation channel characteristic estimation unit 16. c(k) is a transmitted pilot signal of the $k^{th}$ frequency known at the transmission and reception sides.

In Equation (4), the received pilot signal which is not affected by noise is generated by $\Xi(k)c(k)$. An error obtained by subtracting $\Xi(k)c(k)$ from the received pilot signal y(k) corresponds to noise. A variance of noise is calculated by averaging power of the received pilot signal in the frequency direction and calculating a mean square value.

On the other hand, the received signal from which the pilot signal has been separated is converted into a frequency signal by the FFT unit 18. Based on the frequency characteristic of the propagation channel, the equalization unit 19 equalizes the received signal in the frequency domain. The equalization unit 19 outputs an equivalent amplitude gain calculated from a tap coefficient.

First, the equalization unit 19 calculates the tap matrix by Equation (5) using the frequency characteristic of the propagation channel estimated by the propagation channel characteristic estimation unit 16 and the variance value calculated by the variance estimation unit 17.

$$W^H = \Xi^H(\Xi\Xi^H + \sigma^2 I)^{-1} \quad (5)$$

In Equation (5), $\Xi$ is a propagation channel matrix in which a frequency response of a propagation channel is arranged in a diagonal component. $\sigma^2$ is a real number indicating a variance of noise before equalization. I is a unit matrix in which only diagonal components are 1 and non-diagonal components are 0. $x^H$ is an adjoint matrix (Hermitian transpose matrix) of a matrix x. The received signal is equalized by multiplying the received signal by the tap matrix obtained by Equation (5), and the equalized received signal is input to the IFFT unit 20. Also, the equalization unit 19 calculates an equivalent amplitude gain using the tap matrix. The equivalent amplitude gain is calculated by Equation (6).

$$\mu_z = F^H W^H \Xi F \approx \frac{1}{K}tr[W^H \Xi]I \quad (6)$$
$$= \frac{1}{K}I\sum_{k=1}^{K}w^*(k)\Xi(k)$$
$$= \mu I$$

As described above, the equalization unit 19 calculates the tap coefficient to output the received signal equalized from the tap coefficient to the IFFT unit 20, and simultaneously also calculates μ from the tap coefficient.

In Equation (6), F is a complex DFT matrix indicating a DFT operation. $\mu_z$ is a real diagonal matrix in which an equivalent amplitude gain of each symbol within the block is arranged in a diagonal component, but is expressed by a scalar multiple of the unit matrix from Equation (6), so that the equivalent amplitude gain becomes a fixed value μ within the block. In Equation (6), K is the number of signals included within the block. w*(k) is a complex conjugate of the tap coefficient of the $k^{th}$ frequency. $\Xi(k)$ denotes a complex gain of the propagation channel of the $k^{th}$ frequency. Also, μ is expressed by the following Equation (7).

$$\mu = \frac{1}{K}\sum_{k=1}^{K}w^*(k)\Xi(k) \quad (7)$$

The equalized received signal is converted into a time-domain signal by the IFFT unit 20, and the converted signal is input to the demodulation unit 21. The demodulation unit 21 separates a received data signal into received signals of bits, and the received signals of the bits are input to the decoding unit 22. The decoding unit 22 performs error correction.

On the other hand, the post-equalization SNR estimation unit 24 estimates a received SNR after equalization using the equivalent amplitude gain output from the equalization unit 19. Here, a method of calculating an equivalent amplitude gain will be described. The received signal after equalization is expressed by Equation (8) using the transmitted signal, the equivalent amplitude gain, and the equivalent noise.

$$z = \mu s + v_z \quad (8)$$

In Equation (7), z is a received signal vector after equalization. μ is an equivalent amplitude gain which is a fixed value within the block expressed by Equation (6). s is a transmitted signal vector. $v_z$ is an equivalent noise vector. Here, the variance $\sigma_z^2$ of equivalent noise of Equation (8) is expressed by Equation (9).

$$\sigma_z^2 = E[zz^H] - \mu^2 I \quad (9)$$
$$= E[F^H W^H r(F^H W^H r)^H] - \mu^2 I$$
$$= F^H W^H E[rr^H]WF - \mu^2 I$$
$$= F^H W^H(\Xi\Xi^H + \sigma^2 I)WF - \mu^2 I$$
$$= F^H W^H(\Xi\Xi^H + \sigma^2 I)(\Xi\Xi^H + \sigma^2 I)^{-1}\Xi F - \mu^2 I$$
$$= F^H W^H \Xi F - \mu^2 I \approx \frac{1}{K}tr[W^H \Xi]I - \mu^2 I$$
$$= \frac{1}{K}I\sum_{k=1}^{K}w^*(k)\Xi(k) - \mu^2 I$$
$$= (\mu - \mu^2)I$$

In Equation (9), r denotes a received signal before equalization. Since the variance of equivalent noise from Equation (9) is the equivalent amplitude gain itself, the received SNR is expressed by Equation (10) in the case of the MMSE criterion type FDE.

$$SNR = \frac{\mu}{1-\mu} \quad (10)$$

The post-equalization SNR estimation unit 24 estimates a received SNR after equalization by Equation (10) using the equivalent amplitude gain output from the equalization unit 19 in the post-equalization SNR estimation unit 24. The modulation/coding rate information generation unit 25 sets a combination of a modulation scheme and a coding rate in the next transmission opportunity from the obtained received SNR after equalization, generates a modulation/coding rate information signal, and feeds back the generated signal to the transmission device (FIG. 1).

The modulation/coding rate information signal may use other signal formats as long as an information modulation rule is known so that the detection unit of the transmission side is able to detect the modulation scheme and the coding rate.

Also, a signal indicating information of the obtained received SNR after equalization may be transmitted to the transmission device (mobile station device) of FIG. 1, and a modulation/coding mode may be determined from the signal received in the mobile station device.

As described above, this embodiment is able to calculate a received SNR after equalization as shown in Equation (10). By using this embodiment, it is possible to exhibit better characteristics than those of the related art of controlling adaptive modulation and coding schemes based on a received SNR before equalization.

In this embodiment, a method of calculating only an equivalent amplitude gain has been described, but the equalization unit 19 may output only the variance of equivalent noise without having to output the equivalent amplitude gain in consideration of the fact that the variance of equivalent noise is calculated by the equivalent amplitude gain.

In this embodiment, the case of using the MMSE-FDE has been described, but, for example, it is also possible to use zero forcing (ZF) in which an inverse characteristic is multiplied or the like. In the case of using the zero forcing (ZF), the equivalent amplitude gain and the variance of equivalent noise are expressed by the following equations.

$$\mu_z = I \qquad (11)$$

$$\sigma_z^2 = \frac{\sigma^2}{K} \sum_{k=1}^{K} (|w(k)|^2 + 1) \qquad (12)$$

In Equation (12), $\sigma_z^2$ is a variance of equivalent noise. $\sigma^2$ is a variance of thermal noise before equalization. w(k) is a tap coefficient. k is a frequency index. K is the number of points of a discrete frequency in a transmission band.

When this case is applied to this embodiment, an output from the equalization unit 19 is an equalization noise gain, not an equivalent amplitude gain. In this case, a received SNR is given as in Equation (13).

$$SNR = \frac{1}{\sigma_z^2} \qquad (13)$$

Accordingly, even though the zero forcing (ZF) is used, it is possible for the post-equalization received SNR estimation unit 24 to estimate the received SNR by the output of the equalization unit 19 of FIG. 2 which is the received signal and the variance of equivalent noise. In this regard, when the zero forcing (ZF) is used, it is necessary for the equalization unit 19 to surely output the variance of equivalent noise expressed by Equation (12).

An equalization method such as EGC (Equal Gain Combining) or MRC (Maximum Ratio Combining) may be used as a method of calculating a received SNR of an equalization trace.

[Second Embodiment]

Next, a second embodiment of the present invention will be described. Since the transmission device of this embodiment is the same as the transmission device 100a (FIG. 1) according to the first embodiment, description thereof is omitted.

Figure 3:
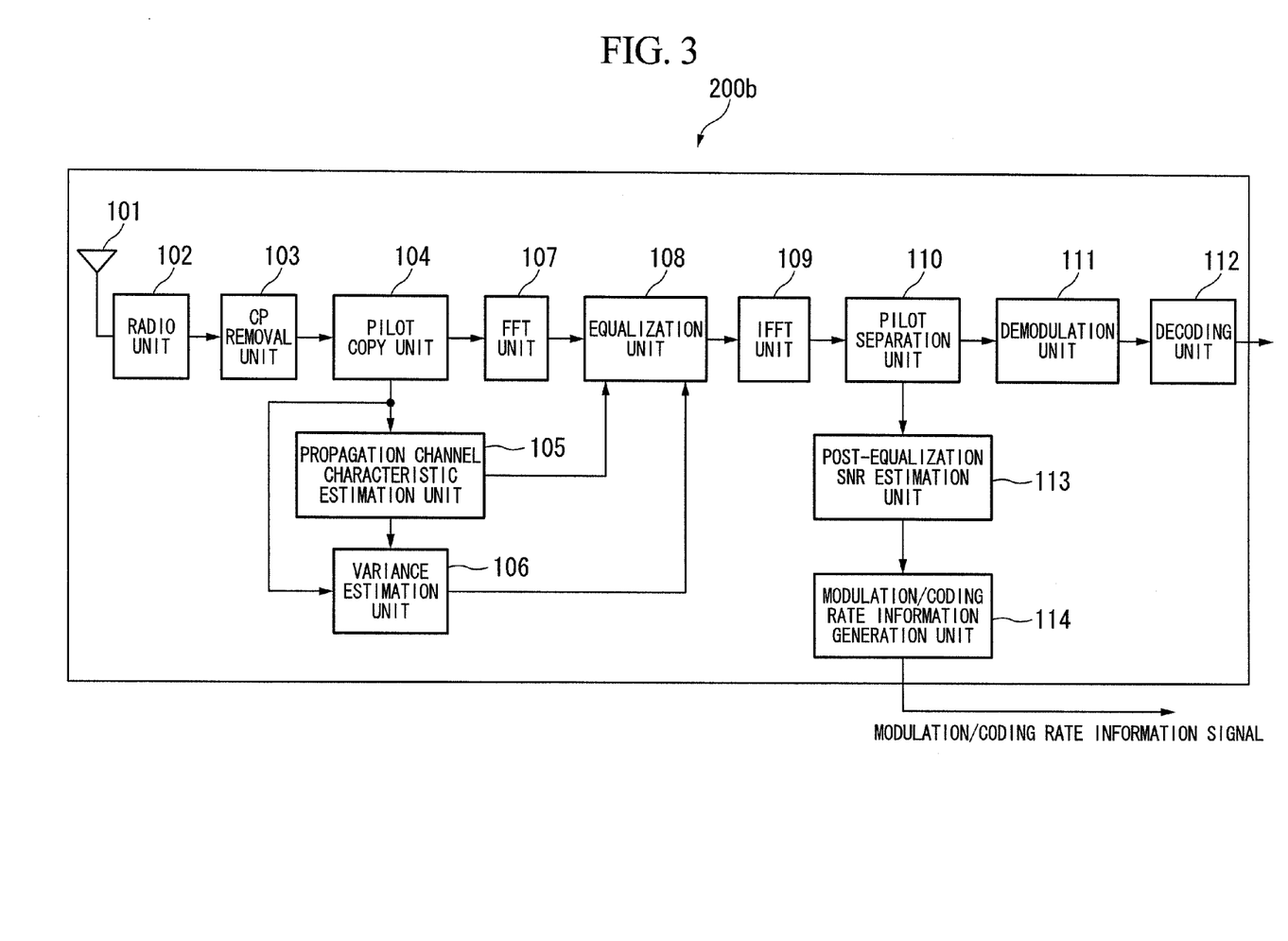
FIG. 3 is a schematic block diagram showing the configuration of a reception device 200b according to a second embodiment of the present invention.

FIG. 3 is a schematic block diagram showing the configuration of a reception device 200b according to the second embodiment of the present invention. The reception device 200b estimates a received SNR after equalization using a pilot signal which is a known signal sequence at the transmission and reception sides.

The reception device 200b has a reception antenna 101, a radio unit 102, a CP removal unit 103, a pilot copy unit 104, a propagation channel characteristic estimation unit 105, a variance estimation unit 106, an FFT unit 107, an equalization unit 108, an IFFT unit 109, a pilot separation unit 110, a demodulation unit 111, a decoding unit 112, a post-equalization SNR estimation unit 113, and a modulation/coding rate information generation unit 114.

Since the reception antenna 101, the radio unit 102, the CP removal unit 103, the propagation channel characteristic estimation unit 105, the variance estimation unit 106, the FFT unit 107, the equalization unit 108, the IFFT unit 109, the demodulation unit 111, the decoding unit 112, and the modulation/coding rate information generation unit 114 of the reception device 200b respectively execute the same process as the reception antenna 12, the radio unit 13, the CP removal unit 14, the propagation channel characteristic estimation unit 16, the variance estimation unit 17, the FFT unit 18, the equalization unit 19, the IFFT unit 20, the demodulation unit 21, the decoding unit 22, and the modulation/coding rate information generation unit 25 of the reception device 200a (FIG. 2) of the first embodiment, description thereof is omitted.

The difference from the first embodiment is that a pilot signal is copied and also equalized to perform propagation channel estimation and variance estimation without separating the pilot signal after removing the cyclic prefix (CP). The pilot signal separation by the pilot separation unit 110 is performed after the IFFT unit 109 so as to calculate a reception situation after equalization.

The post-equalization SNR estimation unit 113 estimates the equivalent amplitude gain and the variance of equalization noise from the pilot signal after equalization. When the equivalent amplitude gain is set as μ and the variance of equivalent noise is set as $\sigma_z^2$, they are expressed by Equations (14) and (15).

$$\mu = \frac{1}{K} \sum_{k=1}^{K} w^*(k) \Xi(k) \qquad (14)$$

$$\sigma_z^2 = \frac{\mu}{1-\mu} \qquad (15)$$

In Equations (14) and (15), k is a discrete frequency index. K is the number of points of a discrete frequency which is being processed.

The post-equalization SNR estimation unit 113 estimates a received SNR by dividing Equation (14) by Equation (15). The modulation/coding rate information generation unit 114 generates a notification signal (modulation/coding rate information signal) and feeds back the generated signal to the transmission device (FIG. 1).

As described above, when a transmitted signal is known in the reception device 200b, a pilot signal is equalized, a received SNR is estimated by measuring the signal after equalization, and a modulation scheme or a coding rate is set. As a result, the modulation scheme may be appropriately controlled and the required quality is maintained or the throughput is improved.

This embodiment in which the MMSE-FDE is used has been described, but, for example, it is possible to use a type of zero forcing (ZF) in which an inverse characteristic is a tap coefficient. The modulation scheme or the coding rate is set by the reception device side, but the modulation scheme or the coding rate may be set by the transmission device side by reporting information regarding the received SNR to the transmission device side.

Following the pilot signal in this embodiment, a desired data signal destined for its own station is transmitted from the transmission device, but a multiplexed data signal may not be destined for its own station. In this case, the quality of reception after equalization may be measured, and the quality of reception after equalization may be periodically measured to be used for adaptive coding and modulation control of data destined for its own station.

The case where the reception device side sets a modulation scheme or a coding rate in the first and second embodiments has been described, but the transmission device may set a modulation scheme or a coding rate by measuring the quality of reception after equalization when a frequency response of a propagation channel is fed back by a CQI (Channel Quality Indicator).

According to the above-described first or second embodiment, the setting of the modulation scheme or the coding rate in the adaptive coding and modulation schemes is estimated from a tap coefficient and a propagation channel characteristic. Accordingly, it is possible to estimate the quality of transmission including the effect of inter-code interference or noise emphasis and it is possible to select an appropriate modulation scheme or coding rate. Thus, it is possible to improve an error rate or throughput when the transmission and reception devices perform communication. The reception device is able to estimate an SNR after equalization, regardless of a delay variance of the propagation channel.

In the above-described embodiment, a control process of the transmission device or the reception device may be executed by recording a program for implementing a function of the transmission device (FIG. 1) or the reception device (FIGS. 2 and 3) to a computer readable recording medium and enabling a computer system to read and execute the program recorded to the recoding medium. The "computer system" used herein includes an OS and hardware, such as peripheral devices.

The "computer readable recording medium" is a portable medium such as a flexible disc, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded to the computer system.

The embodiments of the present invention have been described in detail with reference to the drawings. However, specific configurations are not limited to the embodiments and may include any design in the scope without departing from the subject matter of the present invention.

Industrial Applicability

The present invention is applicable to a radio communication system, a reception device, and a reception method which are able to improve an error rate or throughput when transmission and reception devices perform communication.

The invention claimed is:

1. A radio communication system comprising:
a transmission device configured to transmit data by changing at least one of a modulation scheme and a coding rate based on information reported from a reception device; and
a reception device configured to equalize distortion by a radio propagation channel from a received signal by frequency domain equalization,
wherein the reception device sets at least one of the modulation scheme and the coding rate based on a signal-noise ratio after the frequency domain equalization,
the signal-noise ratio is calculated based on at least one of an equivalent amplitude gain and a variance of equivalent noise calculated by the frequency domain equalization,
the at least one of the equivalent amplitude gain and the variance of equivalent noise is calculated by using a calculation result based on tap coefficient for each frequency and a predetermined value, and
the reception device calculates the equivalent amplitude gain by averaging the product of the tap coefficient of each frequency and the frequency response of a propagation channel in the frequency domain in case that the frequency domain equalization is performed based on a minimum mean square error.

2. The radio communication system according to claim 1, wherein the reception device performs the frequency domain equalization based on zero forcing.

3. The radio communication system according to claim 1, wherein the reception device calculates the variance of equivalent noise by adding 1 to an absolute value of the tap coefficient of each frequency and averaging an addition result in a frequency domain in case that the frequency domain equalization is performed based on zero forcing.

4. The radio communication system according to claim 1, wherein the reception device measures the signal-noise ratio based on a pilot signal for measuring a frequency response of a propagation channel.

5. A reception device comprising:
an equalization unit configured to equalize a received signal in a frequency domain;
a signal-noise ratio measuring unit configured to measure a signal-noise ratio from the received signal after equalization; and
a notification signal generation unit configured to set at least one of a modulation scheme and a coding rate from the signal-noise ratio and generate a signal to be reported to a transmission device, wherein
the signal-noise ratio is calculated based on at least one of an equivalent amplitude gain and a variance of equivalent noise calculated by the frequency domain equalization,
the at least one of the equivalent amplitude gain and the variance of equivalent noise is calculated by using a calculation result based on tap coefficient for each frequency and a predetermined value,
the reception device receives a signal transmitted by the transmission device that changes at least one of the modulation scheme and a coding rate in response to the quality of reception, and
the signal-noise ratio measuring unit calculates a signal-noise ratio after equalization from an equivalent amplitude gain in case that the equalization is performed based on a minimum mean square error.

6. The reception device according to claim 5, wherein the equalization unit equalizes the received signal based on a minimum mean square error.

7. The reception device according to claim 5, wherein the equalization unit equalizes the received signal based on zero forcing.

8. The reception device according to claim 5, wherein the equalization unit outputs at least one of an equivalent amplitude gain or a variance of equivalent noise.

9. The reception device according to claim 5, wherein the signal-noise ratio measuring unit calculates a signal-noise ratio after equalization from an equivalent amplitude gain in case that the equalization is performed based on zero forcing.

10. The reception device according to claim 5, wherein the reception device receives a transmitted signal from the transmission device in which a pilot signal for propagation channel estimation and a transmission data signal in which at least one of the modulation scheme and a coding rate has been changed in response to the quality of reception are multiplexed.

11. The reception device according to claim 10, wherein the signal-noise ratio measuring unit calculates the signal-noise ratio based on a signal obtained by equalizing a received pilot signal.

12. A reception method using a reception device, the reception method comprising:
    an equalization process of equalizing a received signal in a frequency domain;
    a signal-noise ratio measuring process of measuring a signal-noise ratio from the received signal after equalization; and
    a notification signal generation process of setting at least one of a modulation scheme and a coding rate from the signal-noise ratio and generating a signal to be reported to a transmission device, wherein
    the signal-noise ratio is calculated based on at least one of an equivalent amplitude gain and a variance of equivalent noise calculated by the frequency domain equalization,
    the at least one of the equivalent amplitude gain and the variance of equivalent noise is calculated by using a calculation result based on tap coefficient for each frequency and a predetermined value,
    the reception device receives a signal transmitted by the transmission device that changes at least one of the modulation scheme and a coding rate in response to the quality of reception, and
    in the signal-noise ratio measuring process, a signal-noise ratio after equalization is calculated from an equivalent amplitude gain in case that the equalization is performed based on a minimum mean square error.

13. The reception method according to claim 12, wherein the reception device receives a signal transmitted by the transmission device that changes at least one of the a modulation scheme and a coding rate in response to the quality of reception.

14. The reception method according to claim 12, wherein the reception device receives a transmitted signal from the transmission device in which a pilot signal for propagation channel estimation and a transmission data signal in which at least one of the modulation scheme and a coding rate has been changed in response to the quality of reception are multiplexed, the equalization process being made by equalizing a received pilot signal in the frequency domain.

* * * * *